Oct. 23, 1923.
T. W. POST
HEADLIGHT
1,471,355
Original Filed Nov. 5, 1917   4 Sheets-Sheet 1
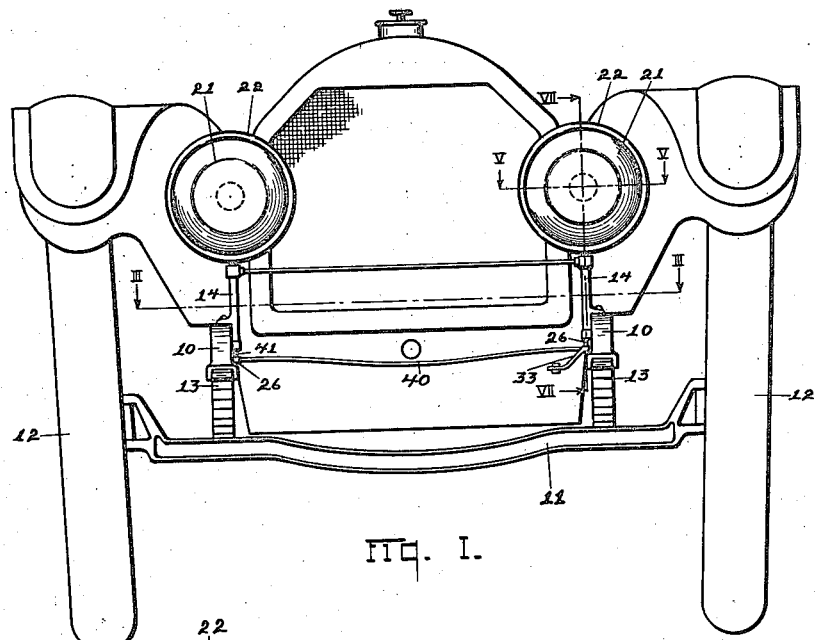
Fig. I.
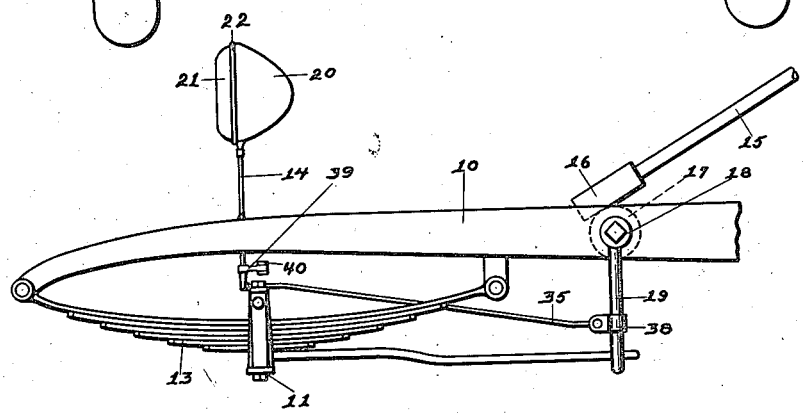
Fig. I.
Inventor
Truman W. Post
By Chester H Braselton
Attorney

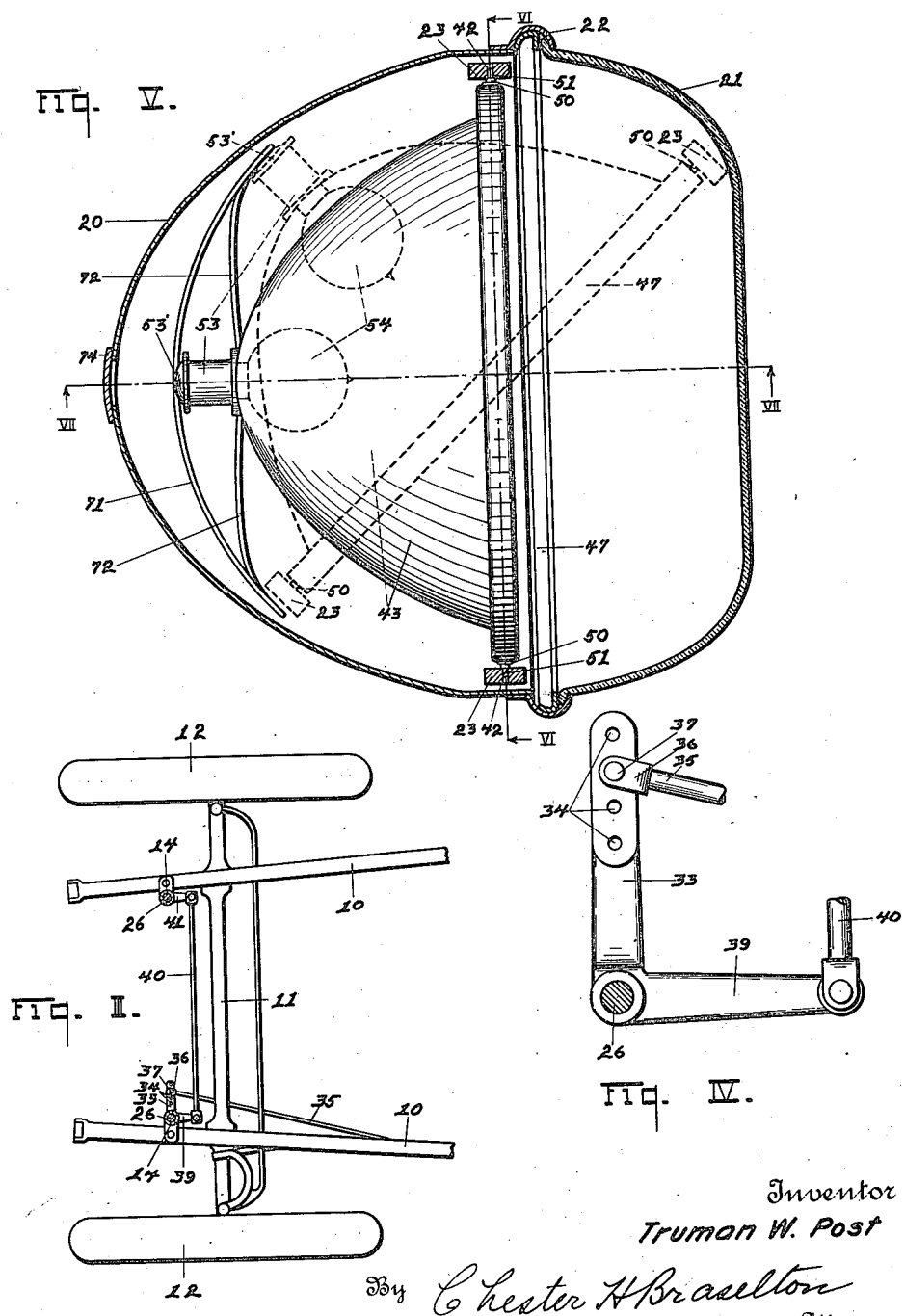

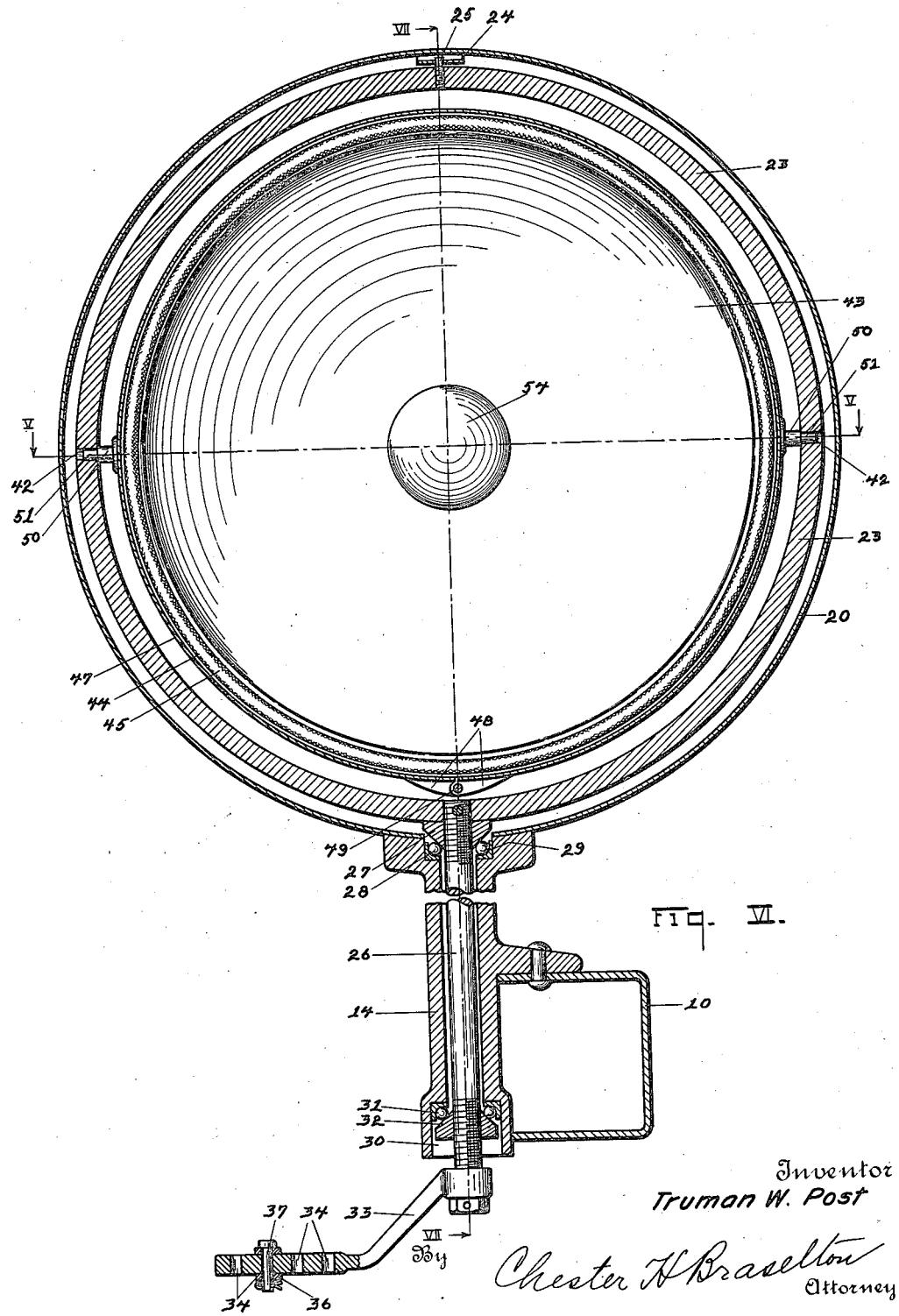

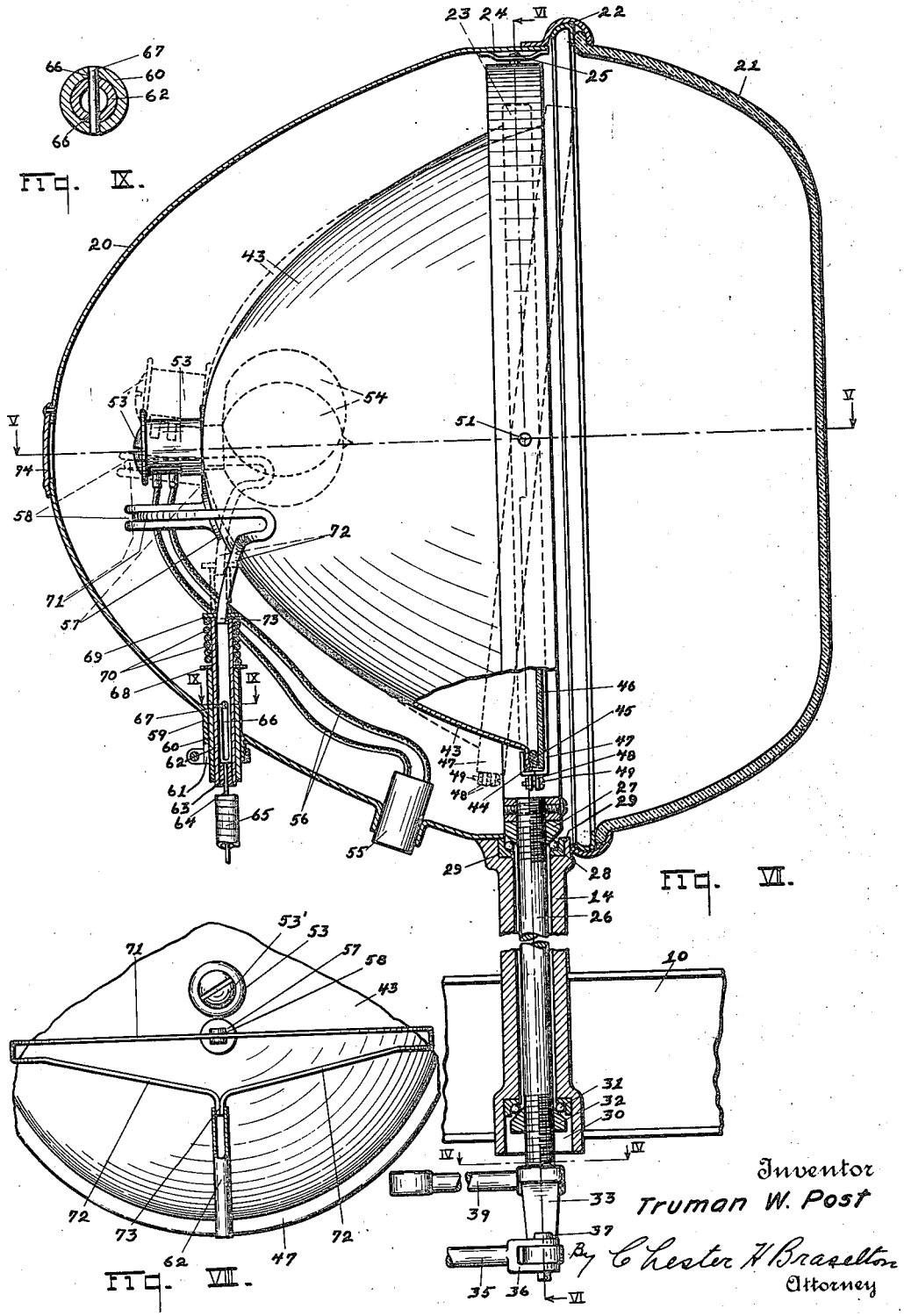

Patented Oct. 23, 1923.

1,471,355

UNITED STATES PATENT OFFICE.

TRUMAN W. POST, OF NEW YORK, N. Y., ASSIGNOR TO ELECTRIC AUTO-LITE CORPORATION, OF TOLEDO, OHIO, A CORPORATION OF DELAWARE.

HEADLIGHT.

Application filed November 5, 1917, Serial No. 200,320. Renewed March 15, 1923.

*To all whom it may concern:*

Be it known that I, TRUMAN W. POST, a citizen of the United States, residing at New York, in the county of New York and State of New York, have invented certain new and useful Improvements in Headlights, of which I declare the following to be a full, clear, and exact description.

This invention relates to improvements in automobile headlights.

The principal object of this invention is to provide an improved automobile headlight having a dirigible reflector mounted therein, in which the reflector is mounted so as to tilt on a horizontal axis, to deflect a beam of light downwardly on the ground in front of the vehicle in order to avoid glare, and so that it may be turned to the right or left to throw the beam of light to the right or left of the road in turning a corner.

A further object of my invention is to provide an automobile headlight, having a dirigible reflector, which is so constructed that the reflector may be turned to the right or left on a vertical axis, automatically upon the actuation of the steering gear to turn the vehicle.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part thereof, in which:

Figure I is a view in front elevation of an automobile equipped with headlights, constructed in accordance with my invention.

Figure II is a view in side elevation of the forward portion of an automobile frame, equipped with headlights constructed in accordance with my invention.

Figure III is a top plan view of the forward portion of an automobile frame equipped with these headlights, said view being taken substantially on the line III—III of Fig. I.

Figure IV is a detail, sectional view, corresponding to a part of Fig. III.

Figure V is a horizontal, sectional view, taken substantially on the line V—V of Figs. I, VI and VII.

Figure VI is a vertical, sectional view taken substantially on the line VI—VI of Figs. V and VII.

Figure VII is a vertical, sectional view, taken substantially on the line VII—VII of Figs. I, V and VI, and Figure VIII is a fragmentary, detail view, showing the rear end of a reflector in rear elevation.

Figure IX is a section on the line IX—IX of Figure VII.

In the drawings, similar reference numerals refer to similar parts throughout the several views, and the sectional views are taken looking in the direction of the arrows at the ends of the section lines.

Considering the numbered parts of the drawings, I have illustrated an automobile chassis, comprising the side frame members 10 and the front axle 11, carrying the wheels 12, and connected with the side members 10 of the frame by means of the springs 13. A headlight support 14 is secured to each side member 10, as illustrated in the drawing. The automobile is provided with the usual steering gear 15, having a worm 16 meshing with the worm gear 17 on the stub-shaft 18, which stub-shaft is provided with the laterally projecting arm 19.

A headlight casing 20 is mounted on the upper end of each of the supports 14 and provided with a front 21 of transparent material, which is dished as shown in the drawings, and held in place by the ring 22, secured to the front of the casing 20. A ring 23 is mounted within the casing 20, adjacent the forward edge thereof, and carries a trunnion 25, which is journaled in a spring trunnion bearing 24, secured to the edge of the casing 20, and comprising a strip of spring metal having its center arched out, and provided with an opening in which the trunnion 25 has its bearing.

A stem 26 is journaled longitudinally in the support 14, and the upper end of said stem is secured to the ring 23 at a point diametrically opposite the trunnion 25. A cone 27 is secured on the upper end of the stem 26 and abuts the ball bearing 28, which is disposed in the pocket 29 formed in the upper part of the casing support 14. A recess or pocket 30 is formed in the lower part of the support 14 and a ball bearing 31 is disposed in said recess and abutted by the cone 32, which is threaded on the lower end of the stem 26. It will be seen that the trunnion 25 and the stem 26, which is journaled in the support 14, together form bearings for the ring 23, so that said ring is journaled on a fixed vertical axis.

An arm 33 is connected to the lower end of the stem 26, the free end of said arm 33, being provided with a plurality of openings 34. A rod 35 has a fork 36 at its forward end, which embraces the end of the arm 33, as shown in Fig. IV of the drawings, and carries a pin 37 which may be disposed through any one of the openings 34, so as to vary the distance between the point at which the rod 35 is connected to the arm 33, and the stem 26. The rear end of the rod 35 is connected to the arm 19 by means of the clip 38. The arm 39 also extends from the stem 26 at right angles to the arm 33, and the free end of the arm 39 is connected by the rod 40 to a corresponding arm 41, projecting from the stem 26 which is connected to the opposite headlight. By this means the reflectors of each of the two headlights provided on the automobile are rotated around a vertical axis, simultaneously, said rotation being caused by the actuation of the steering gear of the vehicle, so that as the steering gear is operated, to turn the vehicle, the light will be deflected to the right or left, according as the vehicle is being turned to the right or the left.

Diametrically opposite openings 42 are provided in the ring 23, said opening being disposed on a horizontal axis of said ring and forming bearings for the reflector trunnions. The reflector 43 is of the usual parabolic shape, the forward edge thereof being bent to form a groove 44, in which is disposed a strip of wicking 45, or other suitable material, forming a packing ring. The forward open end of the reflector 43 is closed by a transparent pane of glass 46, which is held in place by a split clamping ring 47, embracing the periphery of said pane of glass and the forward periphery of the reflector 43, said split clamping ring being channel-shape in order to accomplish this. The ends of said channel-shaped clamping ring are provided with the lugs 48, which are disposed next to each other when the ring is clamped in place, and a bolt 49 passes through the lugs 48 so as to secure the clamping ring in place. Pins 50 are provided at diametrically opposite points on the ring 23, said pins being provided with the reduced outer ends 51, which are disposed in the openings 42, and form the trunnion for the reflector 43. Said trunnions are disposed on a horizontal axis, so that the reflector tilts on a horizontal axis relative to the ring 23, which is mounted to rotate or turn on a fixed vertical axis. A socket 53 is carried by the rear end of the reflector 43 and provided with the usual adjusting screw 53' by means of which the socket may be adjusted relative to the reflector in order to focus the light source. A light bulb 54 is carried by the socket 53, and said socket 53 is connected with the connector 55, carried by the casing 20, by means of the flexible connecting wires 56.

A member 57 is secured to the rear of the reflector 43, just below the socket 53, and extends rearwardly from the reflector. Said member is provided with the horizontally extending groove 58. A sleeve 60 is slidably mounted in the boss 59, provided in the casing 20, and said boss has a split lower end 61, which may be provided with a suitable bolt by means of which the split parts of the boss may be drawn together. A tube 62 is slidably mounted within the sleeve 60, the sleeve being held in place by drawing the lower end of the split boss 61 together so as to grip the sleeve 60. A plug 63 is mounted in the lower end of the tube 62 and connected with the upper end of a wire 64, which is disposed within a flexible tubing 65, forming a conduit for the wire 64. A pair of longitudinally extending diametrically opposite slots 66 is provided in the tube 62, and the sleeve 60 carries a transversely extending pin 67, which extends through the slots 66, and limits the movement of the tube relative to the sleeve 60. A disc or washer 68 is provided around the tube 62 on the upper end of the sleeve 60, and a disc or washer 69 is secured to the upper end of the tube 62. A coiled compression spring 70 is disposed around the upper end of the tube 62, between the washers 68 and 69.

A reflector actuating member is provided, comprising a wire 71, which extends horizontally and is curved on the arc of a circle having its center on the vertical axis upon which the reflector oscillates. This wire 71 extends horizontally and is curved and is normally disposed in slidable engagement in the groove 58 of the rearwardly extending member 57 mounted on the reflector. The free ends 72 of the wire 61 are bent downwardly and inwardly and their extreme ends 73 are mounted in the upper end of the tube 62 and secured thereto, so that a vertical movement of the tube 62 will impart a vertical movement to the horizontally extending curved member 71, which engages the horizontally grooved member 57 connected to the rear of the reflector 43.

It will be seen that, by means of this engagement, a vertical movement may be imparted to the rear of the reflector 43, and this engagement will be effective to tilt the reflector, no matter what the position of the reflector 43, or the ring 23, with relation to the fixed vertical axis may be. That is, this engagement will be effective to tilt the reflector, no matter whether the lights have been turned to the right or left or are in their normal position, casting a beam of light straight ahead. It will also be apparent that the reflector may be tilted to cast the light downwardly while the reflector is disposed to cast a beam of light straight ahead, and that the reflector may be turned to throw the light to one side while it is deflected. The wire 64 may be manipulated to tilt the reflector in any suitable manner, preferably controlled by manual means, which may well be situated on the dash board of the vehicle so as to be readily accessible to the driver.

I have provided an opening at the rear of the casing 20, which is closed by a removable opening 74, through which access may be had to the socket adjustment screw 53' at the rear of the socket 53.

From the description of the parts given above, the operation of this device should be very readily understood. The reflector is mounted to turn on a fixed vertical axis, since the ring 23 in which the reflector is mounted, is journaled on the vertically extending trunnions 25 and 26, so that said ring is mounted to turn on a fixed vertical axis. The reflector is also mounted to turn on a horizontal axis, since the forward edge of the reflector is mounted in the ring 23 by means of the trunnion 51, which extend along a horizontal axis, so that the reflector may be truly said to be mounted on a fixed vertical axis and a horizontal axis.

The actuation of the steering gear to turn the vehicle will cause a rotation of the stub-shaft 18 and a movement of the arm 19. The movement of the arm 19 will be transmitted, through the rod 35, to the arm 33, which is connected to the stem 26, so as to produce a rotation of the stem 26 in its journals. This rotation will also be transmitted to the stem 26 on the opposite side of the vehicle through the arm 39, the rod 40 and the arm 41, connected to the other stem 26, so that both of the headlight reflectors will be turned simultaneously.

It is apparent that the ratio between the turning movement of the vehicle wheels and the turning movement of the reflector is dependent upon the distance between the point at which the rod 35 is connected to the arm 33 and the stem 26. That is, it depends on the length of the arm 33, understanding by the term "length of the arm 33," the distance from the point of connection of the rod 35 to the stem 26. By providing a plurality of openings 34 in the free end of the arm 33, and making the connection at the forward end of the rod 35 so that it may be adjusted to connect it through any one of the openings 34, the length of the arm 33 may be varied so as to change the ratio between the turning movement of the vehicle wheels and the turning movement of the reflector.

As I have previously pointed out, the reflector is turned to the right or left automatically upon the actuation of the steering gear through the turning of the stem 26, which causes a rotation of the ring 23, oscillating the reflector on a vertical axis. This is desirable in order to throw the light to the right or to the left, as when the driver is making a turn. When approaching another vehicle or pedestrian, it is desirable to deflect the light downwardly upon the ground in order to avoid glare, and this is effected by manipulating the wire 54, and causing a vertical movement to the tube 62 and the horizontally curved member 71, which pushes upward upon the member 57, secured to the rear of the reflector, so as to tilt the reflector upon its horizontal axis formed by the trunnions 51. This movement may be effected by manually controlled means and the engagement between the horizontally curved member 71 and the horizontally grooved member 57 is such as to enable this to be effective no matter what the position of the reflector relative to the vertical axis may be.

I am aware that the particular embodiment of my invention, which I have here shown and described, is susceptible of considerable variation without departing from the spirit thereof and, therefore, I desire to claim my invention broadly, as well as specifically, as indicated by the appended claims.

Having thus described my invention, what I claim as new and desire to secure by Letters Patent, is:

1. A device of the class described comprising the combination of a casing; a reflector mounted in said casing and rotatable on a fixed vertical axis and on a horizontal axis; and means for limiting the rotation of said reflector on said horizontal axis.

2. A device of the class described comprising the combination of a casing; a reflector mounted in said casing to turn on a fixed vertical axis and on a horizontal axis; and adjustable means for limiting the movement of said reflector on said horizontal axis.

3. A device of the class described comprising the combination of a casing; a reflector mounted within said casing to turn on a fixed vertical axis and on a horizontal axis; and adjustable means for limiting the tilting of said reflector on said horizontal axis; the angular movement of said reflector on said horizontal axis being the same for all adjustments.

4. A device of the class described comprising the combination with a motor vehicle, having a steering gear, of a headlight casing supported by said vehicle; a ring mounted in said casing to turn on a vertical axis; a stem secured to said ring and rotatable in its support; means for rotating said stem connected with the steering gear to be actuated thereby; and a reflector mounted in said ring to tilt on a horizontal axis.

5. A device of the class described comprising the combination of a casing; a support therefor; a ring pivotally mounted in said casing on a vertical axis and provided with a vertical stem extending through said support; means for rotating said stem; a reflector pivotally mounted in said ring on a horizontal axis passing through the forward part of said reflector; and means engaging the rear of the reflector to tilt the same on its horizontal axis.

6. A device of the class described comprising the combination of a casing; a ring pivotally mounted in said casing on a vertical axis; means for turning said ring on said vertical axis; a reflector mounted in said ring to tilt on a horizontal axis passing through the forward part of said reflector; and means slidably engaging the rear of said reflector to tilt the same on its horizontal axis.

7. A device of the class described comprising the combination of a casing; a reflector mounted in said casing to swing on a fixed vertical axis and on a horizontal axis, the rear of said reflector being provided with a horizontally grooved member; a horizontally extending member curved on the arc of a circle having its center on said vertical axis; and means for imparting a vertical movement to said curved member.

8. A device of the class described comprising the combination of a casing; a reflector mounted in said casing to tilt on a vertical axis and on a horizontal axis; means for tilting said reflector on said vertical axis; a horizontally grooved member extending from the rear of said reflector; a horizontally extending member engaging said grooved member and curved on the arc of a circle having its center on said vertical axis; and means for imparting a vertical movement to said curved member.

9. A device of the class described, comprising the combination of a casing; a reflector mounted in said casing to tilt on a fixed vertical axis and on a horizontal axis; means for tilting said reflector on said fixed vertical axis; a horizontally grooved member extending from the rear of said reflector; a horizontally extending member engaging said grooved member and curved on the arc of a circle having its center on said vertical axis; means for imparting vertical movement to said curved member; and adjustable means for limiting the vertical movement of said curved member.

10. A device of the class described comprising the combination of a casing; a reflector mounted in said casing to tilt on a fixed vertical axis and on a horizontal axis; means for tilting said reflector on said vertical axis; a horizontally grooved member extending from the rear of said reflector; a horizontally extending member engaging in the groove of said grooved member and curved on the arc of a circle having its center on said vertical axis; means for imparting vertical movement to said curved member; and means for limiting the vertical movement of said member, said means being adjustable to change the limits of said movement without varying the total movement thereof.

11. A device of the class described comprising the combination of a casing; a reflector mounted in said casing to tilt on a horizontal axis; means providing a fixed vertical axis on which said reflector may also tilt; and means for limiting the tilting movement of said reflector on said horizontal axis.

12. A device of the class described comprising the combination of a casing; a reflector mounted in said casing to tilt on a vertical axis and on a horizontal axis; means for limiting the tilting movement of said reflector on said horizontal axis, said means being bodily adjustable to change the limits of said movement without changing the total movement.

13. In an automotive vehicle, the combination of a headlight having a reflector mounted to swing on a vertical axis, means operatively connecting said reflector to the steering mechanism of said vehicle for swinging said reflector on said axis and manually controlled means for tilting said reflector, irrespective of its position on its vertical axis.

14. In an automotive vehicle, a dirigible headlight, means connecting said headlight with the steering mechanism of said vehicle to cause the beam of light to be automatically turned thereby and independent means having a sliding connection with said headlight to permit turning thereof for causing the beam to be tilted to a non-glare position.

In testimony whereof I affix my signature.

TRUMAN W. POST.